US012808765B2

United States Patent

Walsh et al.

(12) United States Patent
(10) Patent No.: US 12,808,765 B2
(45) Date of Patent: Nov. 24, 2026

(54) METHOD OF DETERMINING A DENSITY OF ADDITIVELY MANUFACTURED MATERIALS

(71) Applicant: Honeywell Federal Manufacturing & Technologies, LLC, Kansas City, MO (US)

(72) Inventors: Michael A. Walsh, Kansas City, MO (US); Timothy S. Eastman, Kansas City, MO (US); David A. Telep, Kansas City, MO (US); Ryan Eickbush, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 219 days.

(21) Appl. No.: 18/928,733

(22) Filed: Oct. 28, 2024

(65) Prior Publication Data

US 2026/0118242 A1 Apr. 30, 2026

(51) Int. Cl.

| | |
|---|---|
| ***G01N 9/00*** | (2006.01) |
| ***B33Y 50/00*** | (2015.01) |
| ***G01H 13/00*** | (2006.01) |
| ***G01N 29/12*** | (2006.01) |

(52) U.S. Cl.

CPC ............. *G01N 9/002* (2013.01); *G01H 13/00* (2013.01); *G01N 29/12* (2013.01); *B33Y 50/00* (2014.12); *G01N 2291/014* (2013.01)

(58) Field of Classification Search

CPC .. G01N 9/002; G01N 29/12; G01N 2291/014; G01H 13/00; B33Y 50/00

See application file for complete search history.

(56) References Cited

U.S. PATENT DOCUMENTS

| | | | | |
|---|---|---|---|---|
| 6,668,618 | B2 | 12/2003 | Larson, III et al. | |
| 6,786,075 | B2 * | 9/2004 | Radke ................ | G01N 15/0656 73/23.31 |
| 7,424,389 | B2 | 9/2008 | Marcus et al. | |
| 7,782,467 | B2 | 8/2010 | Chappel | |
| 8,182,861 | B2 | 5/2012 | Lee et al. | |
| 10,011,071 | B2 | 7/2018 | Batchelder | |
| 10,724,976 | B2 | 7/2020 | Rogers et al. | |

(Continued)

OTHER PUBLICATIONS

Mass_Determination_with_Piezoelectric_Quartz_Crystal_Resonators; Chin-shun Lu; Jan./Feb. 1975 (Year: 1975).*

(Continued)

*Primary Examiner* — Ryan D Walsh

(74) *Attorney, Agent, or Firm* — Hovey Williams LLP

(57) ABSTRACT

A method for determining a density of a material sample formed by an additive manufacturing process comprises measuring a first resonant frequency of a quartz crystal; depositing a material sample onto the quartz crystal utilizing the additive manufacturing process; measuring a second resonant frequency of a combination of the quartz crystal and the material sample; determining a delta frequency between the first resonant frequency and the second resonant frequency; determining a mass of the material sample that varies according to the delta frequency; measuring a volume of the material sample utilizing a volume measurement component; and calculating a density of the material sample as a quotient of the mass and the volume.

9 Claims, 2 Drawing Sheets

(56) References Cited

U.S. PATENT DOCUMENTS

| | | | | |
|---|---|---|---|---|
| 11,237,387 | B2 | 2/2022 | Magee et al. | |
| 2011/0022353 | A1* | 1/2011 | Wudy | G01G 3/16 702/173 |
| 2012/0201954 | A1* | 8/2012 | Wajid | G01B 7/066 427/9 |
| 2017/0028703 | A1* | 2/2017 | Xu | F01D 11/08 |
| 2019/0234908 | A1* | 8/2019 | Meile | G01N 29/4418 |
| 2025/0110087 | A1* | 4/2025 | Vella | G01N 29/2437 |
| 2025/0369924 | A1* | 12/2025 | Leu | G01N 29/12 |

OTHER PUBLICATIONS

Measurement_of_Youngs_modulus_and_volumetric_mass_density-thickness_of_ultrathin_films_utilizing_resonant_based_mass_sensors; Feb. 24, 2014; Applied Physics Letters; Stachiv et al. (Year: 2014).*

Linking mass measured by the quartz crystal microbalance to the SI; Stambaugh et al.; Feb. 12, 2020; Meterologia (Year: 2020).*

* cited by examiner

METHOD OF DETERMINING A DENSITY OF ADDITIVELY MANUFACTURED MATERIALS

FEDERALLY SPONSORED RESEARCH AND DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to methods for determining a density of a material sample formed by additive manufacturing techniques.

BACKGROUND OF THE INVENTION

Additive manufacturing (AM) processes often involve the deposition of one or more materials onto a substrate surface. It may be desirable to characterize a particular aspect of the AM process such as a density of a specific material after it is deposited. The characterization may include depositing a small sample of the material onto a test substrate. Determining the density of the material requires determining the mass of the material. However, determining the mass of the material can be problematic because of the surface structure of the sample and because of the small amount of the material.

The background discussion is intended to provide information related to the present invention which is not necessarily prior art.

SUMMARY OF THE INVENTION

Embodiments of the current invention address one or more of the above-mentioned problems by providing methods and a system for determining a density of a material sample formed by additive manufacturing that involve the use of a quartz crystal as a substrate onto which a material sample is deposited. A mass of the material sample can be determined by calculating a difference in a resonant frequency of the quartz crystal before and after depositing the material sample. A density of the material sample can be determined from the mass and a measurement of a volume of the material sample. One of the methods broadly comprises measuring a first resonant frequency of a quartz crystal; depositing a material sample onto the quartz crystal utilizing the additive manufacturing process; measuring a second resonant frequency of a combination of the quartz crystal and the material sample; calculating a delta frequency between the first resonant frequency and the second resonant frequency; calculating a mass of the material sample that varies according to the delta frequency; measuring a volume of the material sample utilizing a volume measurement component; and calculating a density of the material sample as a quotient of the mass of the material sample and the volume of the material sample.

Another embodiment of the current invention provides another method for determining a density of a material sample formed by additive manufacturing. The method broadly comprises: measuring a first resonant frequency of a quartz crystal; depositing a material sample onto an upper surface of the quartz crystal in a predetermined area utilizing the additive manufacturing process; sintering the quartz crystal and the material sample; measuring a second resonant frequency of a combination of the quartz crystal and the material sample; calculating a delta frequency between the first resonant frequency and the second resonant frequency; calculating a mass of the material sample that varies according to the delta frequency; measuring a volume of the material sample utilizing a confocal microscope that performs a three-dimensional optical scan of the material sample; and calculating a density of the material sample as a quotient of the mass of the material sample and the volume of the material sample.

Yet another embodiment of the current invention provides a system for determining a density of a material sample formed by additive manufacturing. The system broadly comprises a quartz crystal, a frequency measurement component, an additive manufacturing unit, a volume measurement component, and a computing device. The quartz crystal includes an upper surface on which the material sample is deposited. The frequency measurement component measures a first resonant frequency of the quartz crystal alone and a second resonant frequency of a combination of the quartz crystal and the material sample. The additive manufacturing unit deposits the material sample on the quartz crystal. The volume measurement component measures a volume of the material sample. The computing device receives values of the first resonant frequency, the second resonant frequency, the volume of the material sample, and a mass of the quartz crystal alone, calculates a delta frequency as a difference the first resonant frequency and the second resonant frequency, calculates a mass of the material sample as the delta frequency times the mass of the quartz crystal alone divided by the first resonant frequency, and calculates a density of the material sample as a quotient of the mass of the material sample and the volume of the material sample.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
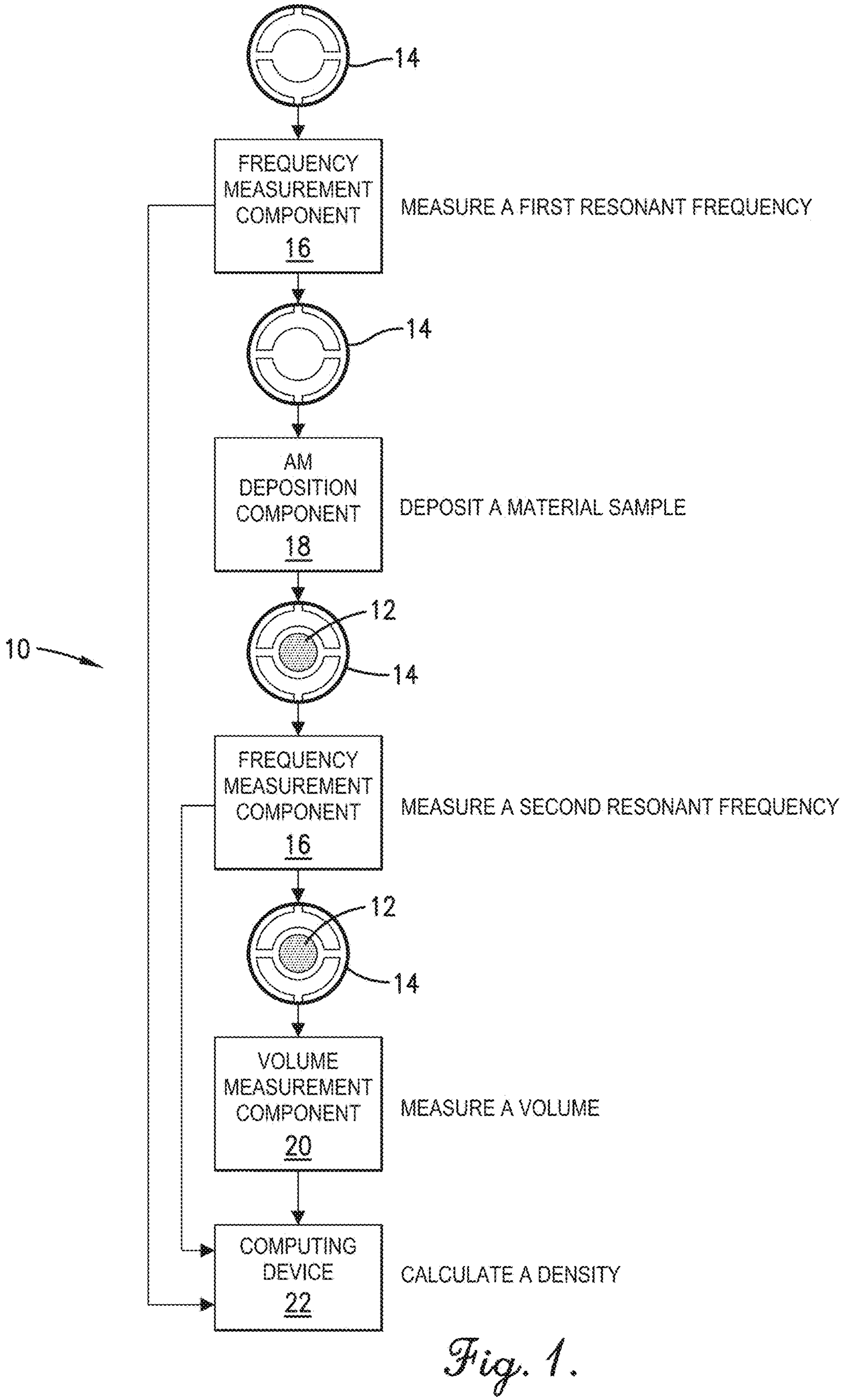
FIG. 1 is a flow diagram of a process, utilizing a system constructed in accordance with various embodiments of the current invention, for determining a density of a material sample formed by additive manufacturing.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Referring to FIG. 1, a flow diagram of a process, utilizing a system 10 constructed in accordance with various embodiments of the current invention, for determining a density of a material sample 12 formed by additive manufacturing is shown. The system 10 is utilized to optimize a process by which materials are deposited onto a substrate, or target, for additive manufacturing techniques. The system 10 broadly comprises a quartz crystal 14, a frequency measurement component 16, an additive manufacturing (AM) deposition component 18, a volume measurement component 20, and a computing device 22.

The quartz crystal 14 receives and retains the material sample 12. The quartz crystal 14 is formed from silica and typically has a disc or circular shape with an upper surface, a lower surface, and a circumferential edge, although other shapes are possible. One or both of the surfaces is coated with a metal or metal alloy to form an electrode. The quartz crystal 14 has a natural resonant frequency. An exemplary quartz crystal 14 has a natural resonant frequency of approximately 6 megahertz (MHz). In addition, the quartz crystal 14 has a mass that is known.

The frequency measurement component 16 measures the resonant frequency of the quartz crystal 14—that is, the frequency at which the quartz crystal 14 oscillates with a maximum amplitude. The frequency measurement component 16 may include quartz crystal microbalance (QCM) components as well as electronic components such as voltage sources, frequency generators, frequency counters, amplifiers, filters, digital to analog converters, analog to digital converters, and the like. In some embodiments, the frequency measurement component 16 may apply a periodic electric voltage with a varying or sweeping frequency to the quartz crystal 14 and determine a frequency at which a voltage across the quartz crystal 14 has a maximum amplitude.

The AM deposition component 18 deposits the material sample 12 on the quartz crystal 14 using AM or three-dimensional (3D) printing techniques. The AM deposition component 18 utilizes one of any number of AM techniques including powder fusion, powder melt, aerosol jet deposition, inkjet deposition, direct ink writing (DIW), directed energy deposition (DED), or the like. The material of the material sample 12 includes inks, polymers, ceramics, metals, metal alloys, and so forth. Exemplary materials include silver ink, copper ink, gold ink, and the like.

The volume measurement component 20 measures a volume of the material sample 12. An exemplary volume measurement component 20 may include a confocal microscope or similar optical measurement device. The volume measurement component 20 may include profilometer components, such as a light source or a laser or other beam source configured to make a 3D optical scan of the material sample 12 or determine the X, Y, Z dimensions of the material sample 12 in order to determine its volume. An exemplary volume measurement component 20 includes a VK-X260 Confocal Microscope by Keyence of Osaka, Japan. In other embodiments, the volume measurement component 20 may include a volume displacement measurement system, such as a fluid displacement measurement system.

The computing device 22 calculates a delta frequency, a mass of the material sample 12, and a density of the material sample 12. The computing device 22 may be embodied by one or more of the following: workstation computers, desktop computers, laptop computers, palmtop computers, notebook computers, tablets or tablet computers, smartphones, calculators, and the like. The computing device 22 includes one or more of the following: a communications port configured to received electronic data wirelessly or through physical cables, a user interface configured to allow a user to enter data, and a processor configured to perform mathematical calculations. The communications port may receive data from the frequency measurement component 16 including the first resonant frequency and the second resonant frequency. The communications port may receive data from the volume measurement component 20 including the volume of the material sample 12. The user interface may allow the user to enter, on a keyboard or the like, the first resonant frequency, the second resonant frequency, the volume, and a mass of the uncoated quartz crystal 14. The processor may receive the values for the first resonant frequency, the second resonant frequency, the volume, and the mass of the uncoated quartz crystal 14. The processor may calculate the delta frequency as a difference between the first resonant frequency and the second resonant frequency. The processor may calculate the mass of the material sample 12 as the delta frequency times the mass of the uncoated quartz crystal 14 divided by the first resonant frequency. The processor may calculate the density of the material sample 12 as the mass of the material sample 12 divided by the volume of the material sample 12.

With reference to FIG. 1, the system 10 is utilized as follows. The quartz crystal 14 is placed in the frequency measurement component 16 and a first resonant frequency of the quartz crystal 14 is measured. The quartz crystal 14 is removed from the frequency measurement component 16 and placed in the AM deposition component 18. The material sample 12 is deposited on an upper surface of the quartz crystal 14. The quartz crystal 14 is removed from the AM deposition component 18 and placed in the frequency measurement component 16 a second time. A second resonant frequency of a combination of the quartz crystal 14 and the material sample 12 is measured. The quartz crystal 14 is removed from the frequency measurement component 16 and placed in the volume measurement component 20. The volume of the material sample 12 is measured. The material sample 12 is removed from the volume measurement component 20. The computing device 22 receives the first resonant frequency, the second resonant frequency, and the volume either from the units 16, 20 that performed the corresponding measurements or from a user who enters the data. The computing device 22 also receives the mass of the uncoated quartz crystal 14 either from an external source or from the user entering the data. The delta frequency, the mass of the material sample 12, and the density of the material sample 12 are each calculated by the computing device 22 as described above.

Figure 2:
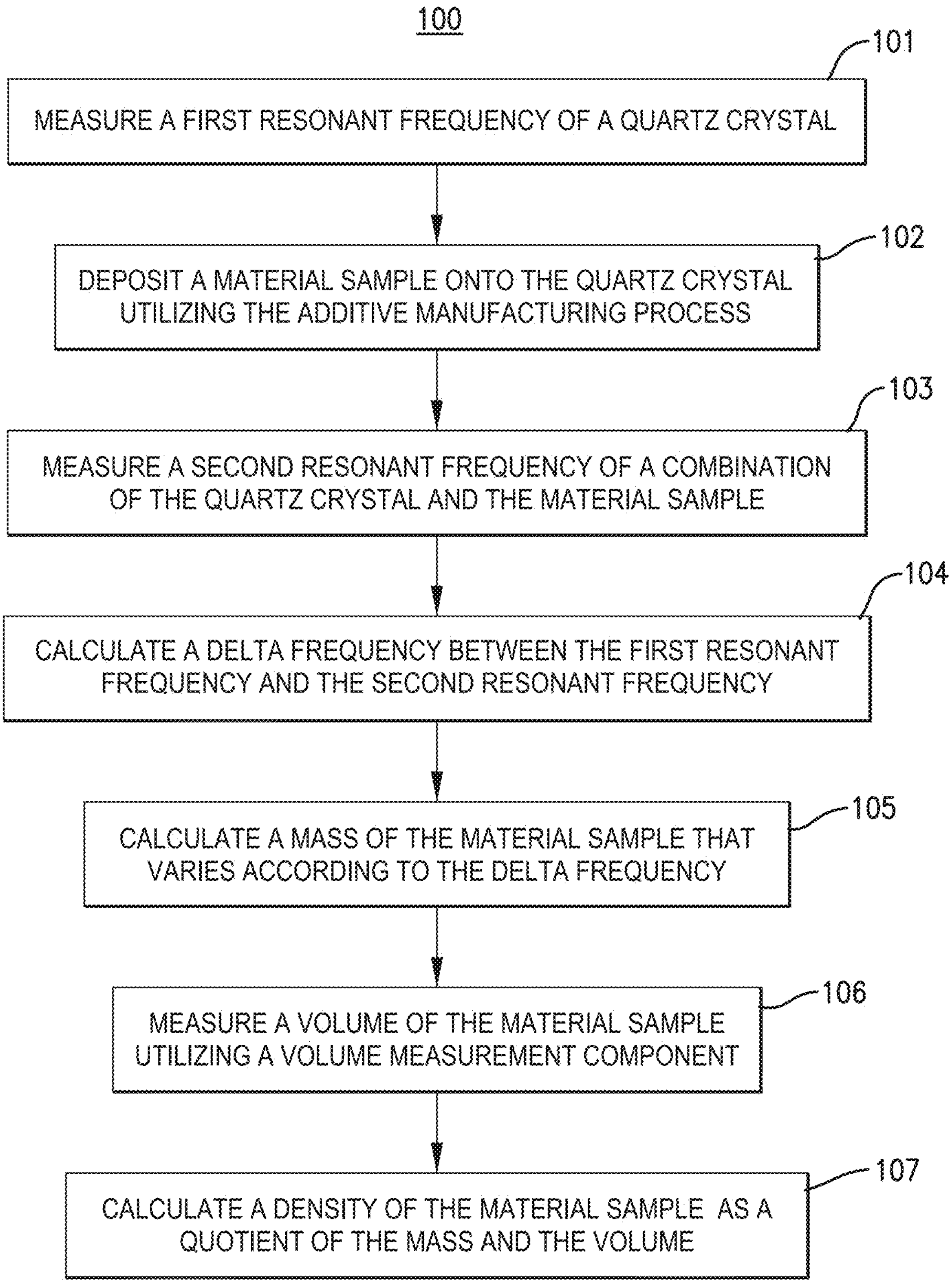
FIG. 2 is a listing of at least a portion of the steps of a method for determining a density of a material sample formed by additive manufacturing.

The system 10 is utilized to perform the steps of an exemplary method 100 for determining a density of a material sample 12 formed by an additive manufacturing process. At least a portion of the steps is shown in FIG. 2. The steps may be performed in the order shown in FIG. 2, or they may be performed in a different order. Furthermore, some steps may be performed concurrently as opposed to sequentially. In addition, some steps may be optional or may not be performed.

Referring to step 101, a first resonant frequency (Fres1) of the quartz crystal 14 is measured using the frequency measurement component 16. In exemplary embodiments, the quartz crystal 14 may be placed in the frequency measurement component 16, which automatically, or on command, measures the resonant frequency of the material sample 12 and displays the value of the frequency in units of hertz (Hz), kilohertz (kHz), or MHz. The first resonant frequency Fres1 is recorded or forwarded to the computing device 22.

Referring to step 102, the material sample 12 is deposited onto the quartz crystal 14 by utilizing the AM deposition component 18. The material of the sample 12 may include polymers, ceramics, metals, metal alloys, and so forth. An exemplary material for the sample 12 includes silver (Ag) ink. The additive manufacturing process may include three-dimensional (3D) printing techniques for use with plastics, powder fusion or melt machines for use with powderized materials, and the like. The material sample 12 is deposited within a predefined or dedicated area on an upper surface of the quartz crystal 14. And, the material sample 12 is deposited to have a predefined maximum thickness. As an example, the area on the upper surface of the quartz crystal 14 may be a circle with a diameter of approximately 6.35 millimeters (mm) positioned roughly in the center of the upper surface of the quartz crystal 14. In addition, the material sample 12 may be deposited to have a thickness or height of up to approximately 7.5 mm for the standard commercial size of the upper surface of the quartz; however, that thickness could increase with the size of the quartz crystal used. Typically, the material sample 12 has a deposited thickness or height of on the order of 1 mm. Exemplary shapes or configurations of the material sample 12 include a dot, a dome, a cylinder or disc, or the like which have dimensions that fall within the previously discussed boundaries. Other exemplary shapes or configurations include a spiral pattern of material whose area and thickness fall within the previously discussed boundaries. The material sample 12 is deposited within these positional and dimensional boundaries because material deposited outside of the boundaries may affect the resonant frequency change of the quartz crystal 14 after deposition in an unpredictable manner or may lead to decreased sensitivity. For example, a second resonant frequency measurement made in step 103 may be erroneous due to material being deposited outside of the positional and dimensional boundaries.

The quartz crystal 14 and the material sample 12 may be sintered or heated to evaporate or remove contaminants, such as organic material. For example, the quartz crystal 14 and the material sample 12 may be sintered at temperatures up to approximately 225 degrees C. for several hours.

Referring to step 103, a second resonant frequency (Fres2) of a combination of the quartz crystal 14 and the material sample 12 is measured. The quartz crystal 14 with the material sample 12 is placed in the frequency measurement component 16 again. The second resonant frequency Fres2 is recorded or forwarded to the computing device 22.

Referring to step 104, a delta frequency (DeltaF) between the first resonant frequency and the second resonant frequency is calculated. The delta frequency DeltaF may be calculated by subtracting the second resonant frequency from the first resonant frequency: DeltaF=Fres1−Fres2. The delta frequency DeltaF is calculated by the computing device 22.

Referring to step 105, a mass (Ms) of the material sample 12 is calculated which varies according to the delta frequency DeltaF, a mass (Mc) of the uncoated quartz crystal 14, and the first resonant frequency Fres1. The mass Ms may be calculated as a product of the delta frequency DeltaF and a quotient of the mass Mc of the uncoated quartz crystal 14 and the first resonant frequency Fres1: Ms=DeltaF×(Mc/Fres1). The mass Ms is calculated by the computing device 22.

Referring to step 106, a volume (Vs) of the material sample 12 is measured utilizing a volume measurement component 20, which makes high resolution measurements of the dimensions of the material sample 12. The volume measurement component 20 may make 3D optical scans of the surface of the quartz crystal 14 with the material sample 12 deposited thereon to determine a profile of the material sample 12. The volume Vs is recorded or forwarded to the computing device 22.

Referring to step 107, a density (Ds) of the material sample 12 is calculated as a quotient of the mass Ms and the volume Vs of the material sample 12: Ds=Ms/Vs. The density Ds is calculated by the computing device 22.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for determining a density of a material sample formed by an additive manufacturing process, the method comprising:
- measuring a first resonant frequency of a quartz crystal;
- depositing a material sample onto the quartz crystal utilizing the additive manufacturing process;
- measuring a second resonant frequency of a combination of the quartz crystal and the material sample;
- calculating a delta frequency between the first resonant frequency and the second resonant frequency;
- calculating a mass of the material sample that varies according to the delta frequency;
- measuring a volume of the material sample utilizing a volume measurement component; and
- calculating a density of the material sample as a quotient of the mass of the material sample and the volume of the material sample.

2. The method of claim 1, wherein the material sample is deposited onto an upper surface of the quartz crystal in a predetermined area.

3. The method of claim 1, further comprising sintering the quartz crystal and the material sample before measuring the second resonant frequency.

4. The method of claim 1, wherein the volume measurement component performs a three-dimensional optical scan of the material sample to measure the volume of the material sample.

5. The method of claim 1, wherein the volume measurement component includes a confocal microscope.

6. A method for determining a density of a material sample formed by an additive manufacturing process, the method comprising:
- measuring a first resonant frequency of a quartz crystal;
- depositing a material sample onto an upper surface of the quartz crystal in a predetermined area utilizing the additive manufacturing process;
- sintering the quartz crystal and the material sample;
- measuring a second resonant frequency of a combination of the quartz crystal and the material sample;
- calculating a delta frequency between the first resonant frequency and the second resonant frequency;
- calculating a mass of the material sample that varies according to the delta frequency;
- measuring a volume of the material sample utilizing a confocal microscope that performs a three-dimensional optical scan of the material sample; and
- calculating a density of the material sample as a quotient of the mass of the material sample and the volume of the material sample.

7. A system for determining a density of a material sample formed by an additive manufacturing process, the system comprising:
- a quartz crystal including an upper surface on which the material sample is deposited;
- a frequency measurement component configured to measure a first resonant frequency of the quartz crystal alone and a second resonant frequency of a combination of the quartz crystal and the material sample;
- an additive manufacturing unit configured to deposit the material sample on the quartz crystal;
- a volume measurement component configured to measure a volume of the material sample; and
- a computing device configured to:
  - receive values of the first resonant frequency, the second resonant frequency, the volume of the material sample, and a mass of the quartz crystal alone,
  - calculate a delta frequency as a difference the first resonant frequency and the second resonant frequency,
  - calculate a mass of the material sample as the delta frequency times the mass of the quartz crystal alone divided by the first resonant frequency, and
  - calculate a density of the material sample as a quotient of the mass of the material sample and the volume of the material sample.

8. The system of claim 7, wherein the additive manufacturing unit is further configured to deposit the material sample on the upper surface of the quartz crystal in a predetermined area.

9. The system of claim 7, wherein the volume measurement component includes a confocal microscope configured to perform a three-dimensional optical scan of the material sample to measure the volume of the material sample.

* * * * *